(12) United States Patent
Flores Bahamonde et al.

(10) Patent No.: US 12,334,833 B2
(45) Date of Patent: Jun. 17, 2025

(54) PARTIAL POWER DC-DC CONVERTER WITH CONTROLLABLE TOPOLOGY

(71) Applicant: UNIVERSIDAD TÉCNICA FEDERICO SANTA MARÍA, Valparaíso (CL)

(72) Inventors: Freddy Arturo Flores Bahamonde, Santiago (CL); Arnau Ibarz Claret, Tarragona (ES); Samir Felipe Kouro Renaer, Viña del Mar (CL); Hugues Jean-Marie Renaudineau, Valparaíso (CL); Sebastián Andre Rivera Iunnissi, Santiago (CL)

(73) Assignee: UNIVERSIDAD TÉCNICA FEDERICO SANTA MARÍA, Valparaíso (CL)

( * ) Notice: Subject to any disclaimer, the term of this patent is extended or adjusted under 35 U.S.C. 154(b) by 180 days.

(21) Appl. No.: 18/270,680

(22) PCT Filed: Dec. 28, 2021

(86) PCT No.: PCT/CL2021/050126
§ 371 (c)(1),
(2) Date: Aug. 7, 2023

(87) PCT Pub. No.: WO2022/140873
PCT Pub. Date: Jul. 7, 2022

(65) Prior Publication Data
US 2024/0072677 A1    Feb. 29, 2024

(30) Foreign Application Priority Data

Dec. 30, 2020   (CL) .................................. 3436-2020

(51) Int. Cl.
*H02M 3/335*    (2006.01)
*H02M 3/158*    (2006.01)
(Continued)

(52) U.S. Cl.
CPC ... *H02M 3/33584* (2013.01); *H02M 3/33573* (2021.05); *H02M 1/0074* (2021.05);
(Continued)

(58) Field of Classification Search
CPC .......................... H02M 3/158; H02M 3/33584
See application file for complete search history.

(56) References Cited

U.S. PATENT DOCUMENTS 6,370,047 B2 * 4/2002 Mallory ................ H02M 7/493
363/71
6,963,497 B1 * 11/2005 Herbert ................... H02M 3/07
363/133

(Continued)

FOREIGN PATENT DOCUMENTS

WO    2015172254 A1    11/2015

OTHER PUBLICATIONS

International Search Report dated Mar. 25, 2022, in PCT/CL2021/050126.

(Continued)

*Primary Examiner* — Gary A Nash
(74) *Attorney, Agent, or Firm* — Procopio, Cory, Hargreaves & Savitch LLP

(57) ABSTRACT

The invention provides a partial power DC-DC converter with controllable topology, comprising: a galvanically isolated DC-DC converter having a positive and negative input; a positive and negative output; a DC voltage input electrically connected to said positive input of the DC-DC converter; an input reference; a DC voltage output electrically connected to said positive output of the DC-DC converter; an output reference electrically connected to said input reference; said partial power DC-DC converter additionally comprising: a first switch for selectively connecting said positive input to said negative output of the DC-DC con-
(Continued)

verter; a second switch for selectively connecting said negative input of the DC-DC converter to said input reference; a third switch for selectively connecting said negative output of the DC-DC converter to said output reference; and a fourth switch for selectively connecting said positive output to said negative input of the DC-DC converter.

7 Claims, 4 Drawing Sheets

(51) Int. Cl.
    *H02M 1/00*           (2006.01)
    *H02M 3/28*           (2006.01)

(52) U.S. Cl.
    CPC .......... *H02M 1/0077* (2021.05); *H02M 3/158* (2013.01); *H02M 3/285* (2013.01)

(56) References Cited

U.S. PATENT DOCUMENTS

| | | | |
|---|---|---|---|
| 7,042,199 B1 * | 5/2006 | Birchenough | H02M 3/1582 |
| | | | 363/132 |
| 9,397,548 B2 * | 7/2016 | Li | H02M 3/06 |
| 9,960,687 B2 | 5/2018 | Elasser et al. | |
| 10,116,221 B2 | 10/2018 | Iwaya et al. | |
| 10,199,950 B1 * | 2/2019 | Vinciarelli | H02M 3/33576 |
| 10,384,628 B2 | 8/2019 | Mohrmann et al. | |

OTHER PUBLICATIONS

Zapata et al., "Analysis of Partial Power DC-DC Converters for Two-Stage Photovoltaic Systems," IEEE Journal of Emerging and Selected Topics in Power Electronics, vol. 7, No. 1, Mar. 2019, pp. 591-603.

Zapata et al.,"Partial Power DC-DC Converters for Two Stage Photovoltaic Energy Conversion Systems," Universidad Tecnica Federico Santa Maria, 2018 https://repositorio.usm.cl/handle/11673/40704.

Zapata et al.,"Step-Down Partial Power DC-DC Converters for Two-Stage Photovoltaic String Inverters," https://www.researchgate.net/publication/330373974_Step-Down_Partial_Power_DC-DC_Converters_for_Two-Stage_Photovoltaic_String_Inverters Electronics 2019, 8, 87; doi:10.3390/electronics8010087.

Zapata et al.,"Partial Power DC-DC Converter for Photovoltaic Microinverters," 23.10.2016 IEEE IECON2016 https://doi.org/10.1109/IECON.2016.7793098.

* cited by examiner (State of the Art)

(State of the Art)

PARTIAL POWER DC-DC CONVERTER WITH CONTROLLABLE TOPOLOGY

TECHNICAL FIELD OF INVENTION

The present invention relates to the field of electrical power generation, conversion, or distribution; more specifically to the field of converting a DC input into a DC output, and in particular provides a partial power DC-DC converter with controllable topology.

BACKGROUND OF THE INVENTION

Within the field of power conversion, partial power converters have become relevant in recent times. In general, partial power converters are known to have intrinsic advantages, such as reduced power losses, system size and cost. The underlying principle is that power is split between a direct power link between the input and output, and a portion that is processed by a DC-DC converter. This is achieved by connecting one of the inputs of the DC-DC converter to one of the outputs of the same.

There are two types of partial power DC-DC converters, namely, type I (seen in FIG. 1), where the power splitting is performed on the input side of the partial power DC-DC converter, and type II (seen in FIG. 2), where the power splitting is performed on the output side of the partial power converter (usually referred to as DC-link). Additionally, within each configuration (type I or type II) there is a step-up configuration, in which the output voltage is higher than the input voltage, and a step-down configuration, in which the output voltage is lower than the input voltage.

One of the advantages of partial power DC-DC converters is that the relation between the input and output voltage depends only on the connection topology, but not on the type of DC-DC converter used.

In the prior art, applications of partial power DC-DC converters in photovoltaic electric power generation and electromobility are known. For example, document U.S. Pat. No. 9,960,687 describes a type I partial power DC-DC converter that uses a galvanically isolated bidirectional DC-DC converter.

The inventors of the present invention have discovered, however, that in some applications it is preferable to have a partial power DC-DC converter whose topology is controllable between a type I and a type II. A partial power DC-DC converter with both characteristics, however, is not described in the prior art. Accordingly, a partial power DC-DC converter whose topology is controllable between a type I and type II is required.

SUMMARY OF THE INVENTION

The present invention provides a partial power DC-DC converter with controllable topology, characterized in that it comprises: a galvanically isolated DC-DC converter having a positive input, a negative input, a positive output, and a negative output; a first DC voltage input electrically connected to said positive input of said DC-DC converter; an input reference; a first DC voltage output electrically connected to said positive output of said DC-DC converter; and an output reference electrically connected to said input reference wherein said partial power DC-DC converter additionally comprises: a first switch arranged to selectively connect said positive input to said negative output of said DC-DC converter; a second switch arranged to selectively connect said negative input of said DC-DC converter to said input reference; a third switch arranged to selectively connect said negative output of said DC-DC converter to said output reference; and a fourth switch arranged to selectively connect said positive output to said negative input of said DC-DC converter.

In a preferred embodiment, the partial power converter is characterized in that said first switch, said second switch, said third switch, and said fourth switch are unidirectional switches. In a more preferred embodiment, the partial power converter claimed is characterized in that each of said unidirectional switches consists of a field effect transistor in anti-parallel with a rectifier diode.

In another preferred embodiment, the partial power converter is characterized in that said first switch, said second switch, said third switch, and said fourth switch are bidirectional switches.

In a further preferred embodiment, the partial power converter is characterized in that said DC-DC converter is selected from the group consisting of forward converters, push-pull converters, H-bridge converters, and flyback converters, or any other isolated DC-DC topology.

In another preferred embodiment, the partial power converter is characterized in that said DC-DC converter comprises a transformer having a primary and a secondary, an H-bridge connected to the primary of said transformer, and a bridge rectifier connected to the secondary of said transformer. In a more preferred embodiment, the partial power converter is characterized in that said transformer has a center-tapped secondary.

DETAILED DESCRIPTION OF THE INVENTION

The present invention will be described below in detail, referring for this purpose to the figures accompanying the present application.

Figure 3:
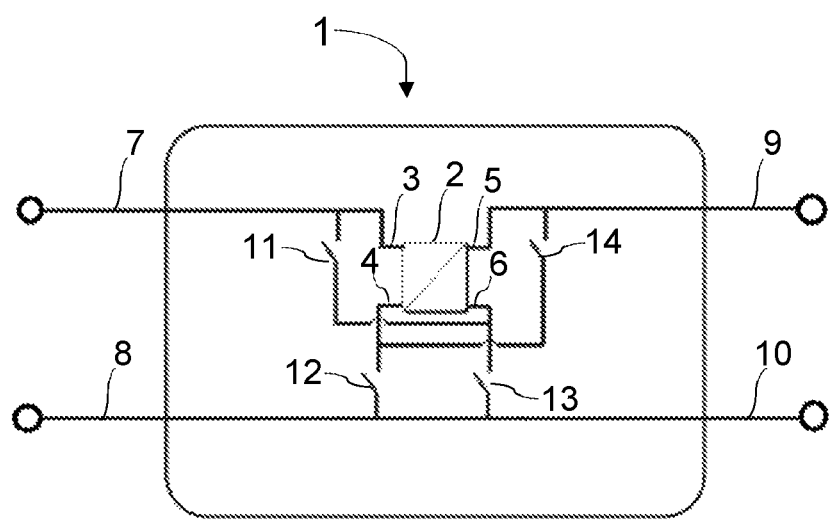
FIG. 3 schematically illustrates an embodiment of the partial power converter with controllable topology which is the subject matter of the present invention.

In a first subject matter of the present invention, as schematically illustrated in FIG. 3, a partial power DC-DC converter (1) with controllable topology is provided, comprising, essentially: a DC-DC converter (2) having a positive input (3), a negative input (4), a positive output (5), and a negative output (6); a first DC voltage input (7) electrically connected to said positive input (3) of said DC-DC converter (2); an input reference (8); a first DC voltage output (9) electrically connected to said positive output (5) of said DC-DC converter (2); and an output reference (10) electrically connected to said input reference (8). Said partial power DC-DC converter (1) additionally comprises: a first switch (11) arranged to selectively connect said positive input (3) to said negative output (6) of said DC-DC converter (2); a second switch (12) arranged to selectively connect said negative input (4) of said DC-DC converter (2) to said input reference (8); a third switch (13) arranged to selectively connect said negative output (6) of said DC-DC converter (2) to said output reference (10); and a fourth switch (14) arranged to selectively connect said positive output (5) to said negative input (4) of said DC-DC converter (2).

Hereinafter, for reasons of simplicity and without limiting the scope of the present invention, reference will be made to the partial power DC-DC converter (1) with controllable topology which is the subject of the present invention as a partial power DC-DC converter (1).

In the context of the present invention, a DC-DC converter will be understood as a set of electrical and electronic components arranged such that, in response to a continuous (DC) input signal, it generates a DC output signal. Normally, the relation between the input voltage and the output voltage of a DC-DC converter is controlled by the ratio between the opening time and the closing time of one or more switches forming part of said DC-DC converter.

The DC-DC converter (2) forming part of the partial power DC-DC converter (1) which is the subject matter of the present invention features two inputs which, in the context of the present invention and without limiting the scope of the present invention, will be referred to as positive input (3) and negative input (4). Furthermore, the DC-DC converter (2) features two outputs which, in the context of the present invention and without limiting the scope of the same, will be referred to as positive output (5) and negative output (6).

The DC-DC converter (2) may be any type of DC-DC converter (2) having galvanic isolation, without limiting the scope of the present invention. In a more preferred embodiment, without limiting the scope of the present invention, said DC-DC converter (2) may be a galvanically isolated converter which may be selected, for example and without limiting the scope of the present invention, from the group consisting of forward converters, push-pull converters, H-bridge converters, flyback converters, half bridge converters, and Ćuk converters. Additionally, said DC-DC converter (2) may be unidirectional or bidirectional without limiting the scope of the present invention. The unidirectional or bidirectional nature will depend, for example and without limiting the scope of the present invention, on the specific application given to the partial power DC-DC converter (1) which is the subject matter of the present invention.

For example, and without limiting the scope of the present invention, when the partial power DC-DC converter (1) which is the subject matter of the present invention is used to connect a solar photovoltaic module to a DC bus, said DC-DC converter (2) may be unidirectional. In another example, without limiting the scope of the present invention, when the partial power DC-DC converter (1) which is the subject matter of the present invention is used to connect a battery to an inverter in an electric vehicle, said DC-DC converter (2) may be a bidirectional converter.

In a preferred embodiment, without limiting the scope of the present invention, said DC-DC converter (2) may comprise a transformer (21) having a primary and a secondary, an H-bridge (22) connected to the primary of said transformer (21), and a bridge rectifier (23) connected to the secondary of said transformer (21). The relation between the number of turns of the primary and the secondary of said transformer (21) does not limit the scope of the present invention.

In a more preferred embodiment, without limiting the scope of the present invention, said transformer (21) may have a center-tapped secondary. In this last preferred embodiment, without limiting the scope of the present invention, said bridge rectifier (23) may be replaced by two rectifier diodes, each connected to one end of said secondary.

The partial power DC-DC converter (1) which is the subject matter of the present invention further comprises a first DC voltage input (7) electrically connected to the positive input (3) of the DC-DC converter (2); and a first DC voltage output (9) electrically connected to the positive output (5) of said DC-DC converter (2). Furthermore, the partial power DC-DC converter (1) which is the subject matter of the present invention comprises an input reference (8) and an output reference (10) electrically connected to said input reference (8). In this way, for example and without limiting the scope of the present invention, the partial power DC-DC converter (1) which is the subject matter of the present invention allows the connection between two DC devices, which are connected, respectively, to said first DC voltage input (7) and to said input reference (8); and to said first DC voltage output (9) and to said output reference (10).

As previously mentioned, the partial power DC-DC converter (1) which is the subject matter of the present invention additionally comprises a set of switches (11, 12, 13, 14) that allow to control the topology of the partial power DC-DC converter (1) which is the subject matter of the present invention between a type I topology and a type II topology. A first switch (11) is arranged to selectively connect the positive input (3) to the negative output (6) of the DC-DC converter (2). A second switch (12) is arranged to selectively connect said negative input (4) of said DC-DC converter (2) to the input reference (8). A third switch (13) is arranged to selectively connect said negative output (6) of said DC-DC converter (2) to the output reference (10). A fourth switch (14) is arranged to selectively connect said positive output (5) to said negative input (4) of said DC-DC converter (2).

In the context of the present invention, the term selective connection is to be understood as a connection which is controlled by the switching state of a switch. In this sense, for example and without limiting the scope of the present invention, when the first switch (11) is in the closed position, an electrical connection is provided between the positive input (3) and the negative output (6) of the DC-DC converter (2). In contrast, when the first switch (11) is in the open position, the electrical connection between the positive input (3) and the negative output (6) of said DC-DC converter (2) is interrupted. Similarly, without limiting the scope of the present invention, the electrical connection between the negative input (4) of said DC-DC converter (2) and the input reference (8) is controlled by the switching state of the second switch (12); the electrical connection between the negative output (6) of said DC-DC converter (2) and the output reference (10) is controlled by the switching state of the third switch (13); and the electrical connection between the positive output (5) and the negative input (4) of said DC-DC converter (2) is controlled by the switching state of the fourth switch (14).

Moreover, the nature of said first switch (11), said second switch (12), said third switch (13), and said fourth switch (14) does not limit the scope of the present invention. Said first switch (11), second switch (12), third switch (13), and fourth switch (14) may or may not be implemented in the same manner without limiting the scope of the present invention.

In a preferred embodiment, without limiting the scope of the present invention, said first switch (11), said second switch (12), said third switch (13), and said fourth switch (14) may be unidirectional switches. Said configuration may be obtained, for example and without limiting the scope of the present invention, by arranging a transistor in parallel with a rectifier diode. Said transistor may be a bipolar transistor or a field effect transistor without limiting the scope of the present invention. In a preferred embodiment, without limiting the scope of the present invention, said transistor is a field effect transistor and said rectifier diode is connected anti parallel to the source and to the drain of said field effect transistor.

However, in other preferred embodiments, said first switch (11), second switch (12), third switch (13), said fourth switch (14) may be bidirectional switches. Said configuration may be obtained, for example and without limiting the scope of the present invention, by arranging two unidirectional switches parallel to each other, wherein said unidirectional switches allow current flow in directions opposite to each other. Furthermore, in this preferred embodiment, said two unidirectional switches connected in parallel must be controlled in such a way that their switching state is the same at all times.

As previously mentioned, the switching state of said first switch (11), second switch (12), third switch (13), and fourth switch (14) make it possible to control the topology of the partial power DC-DC converter which is the subject matter of the present invention between a type I topology and a type II topology. However, advantageously and without limiting the scope of the present invention, the partial power DC-DC converter (1) which is the subject of the present invention has a third mode of operation which will be referred to, without limiting the scope of the present invention, as bypass. In said bypass configuration, the DC device, which is connected to the first voltage input (7) and to the first reference (8), is directly connected to the DC device that is connected to the first voltage output (9) and to the second reference (10), independently of the operation of the DC-DC converter (2).

Figure 1:
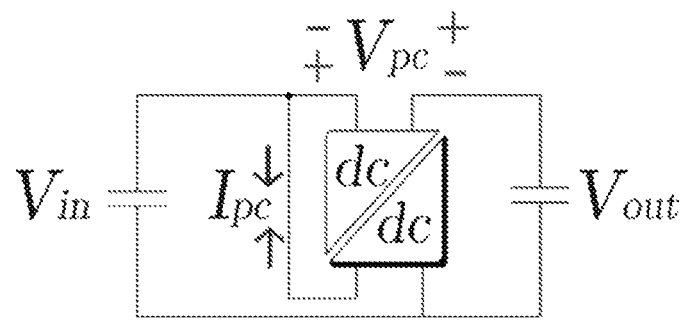
FIG. 1 illustrates a type I partial power converter of the prior art.

In order to bring the partial power DC-DC converter (1) which is the subject matter of the present invention to a type I topology, said first switch (11) and said second switch (12) must be kept closed, while keeping open said third switch (13) and said fourth switch (14). In this way, the partial power DC-DC converter (1), which is schematically illustrated in FIG. 3, will acquire the topology illustrated in FIG. 1.

Figure 2:
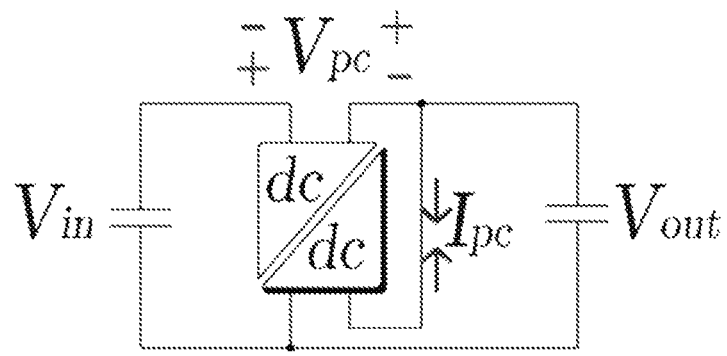
FIG. 2 illustrates a type II partial power converter of the prior art.

In order to bring the partial power DC-DC converter (1) which is the subject matter of the present invention to a type II topology, said first switch (11) and said second switch (12) must be kept open, while keeping closed said third switch (13) and said fourth switch (14). In this way, the partial power DC-DC converter (1), schematically illustrated in FIG. 3, will acquire the topology illustrated in FIG. 2.

Finally, in order to bring the partial power DC-DC converter (1) which is the subject matter of the present invention into a bypass topology, said first switch (11) must be kept closed, while keeping open said second switch (12), said third switch (13), and said fourth switch (14).

According to the previous description, it is possible to obtain a partial power DC-DC converter (1) whose topology is controllable between a type I, a type II, and a bypass topology, and which allows the connection of two DC devices.

Furthermore, in other preferred embodiments and without limiting the scope of the present invention, it is possible to provide other configurations for the interconnection between DC devices. To this end, a plurality of partial power DC-DC converters (1a, 1b, 1c), each according to the present invention, can be arranged and connected according to the desired configuration.

Figure 7:
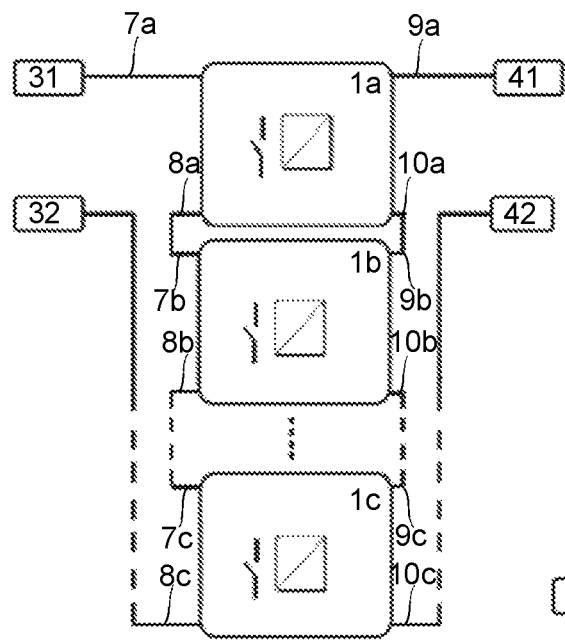
FIG. 7 illustrates the interconnection of a plurality of partial power DC-DC converters in accordance with the present invention in an input-series, output-series configuration.

In a first exemplary embodiment, as illustrated in FIG. 7 and without limiting the scope of the present invention, said plurality of partial power DC-DC converters (1a, 1b, 1c) may be connected in an Input-Series, Output-Series (ISOS) configuration. In this configuration, the positive DC terminal of the first DC device is connected to the first DC voltage input (7a) of the first partial power DC-DC converter (1a) of the plurality. On its part, the negative DC terminal of the first DC device is connected to the input reference (8c) of the last partial power DC-DC converter (1c). Similarly, the positive DC terminal of the second DC device is connected to the first DC voltage output (9a) of the first partial power DC-DC converter (1a) and the negative DC terminal of the second DC device is connected to the output reference (10c) of the last partial power DC-DC converter (1c). In turn, the input reference (8a) of the first partial power DC-DC converter (1a) is connected to the first voltage input (7b) of the second partial power DC-DC converter (1b), the input reference (8b) of the second partial power DC-DC converter (1b) to the first voltage input (7c) of the third partial power DC-DC converter (1c), and so on until all inputs of the plurality of partial power DC-DC converters (1a, 1b, 1c) are connected. Similarly, the output reference (10a) of the first partial power DC-DC converter (1a) is connected to the first voltage output (9b) of the second partial power DC-DC converter (1b), the output reference (8b) of the second partial power DC-DC converter (1b) to the first voltage output (9c) of the third partial power DC-DC converter (1c), and so on until all outputs of the plurality of partial power DC-DC converters (1a, 1b, 1c) are connected.

Figure 8:
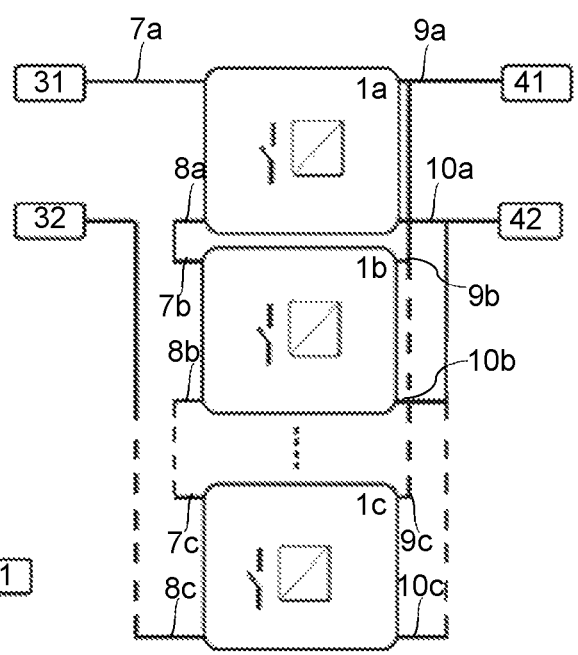
FIG. 8 illustrates the interconnection of a plurality of partial power DC-DC converters in accordance with the present invention in an input-series, output-parallel configuration.

In a second exemplary embodiment, as illustrated in FIG. 8 and without limiting the scope of the present invention, said plurality of partial power DC-DC converters (1a, 1b, 1c) may be connected in an Input-Series, Output-Parallel (ISOP) configuration. In this configuration, the positive DC terminal of the first DC device is connected to the first DC voltage input (7a) of the first partial power DC-DC converter (1a) of the plurality. On its part, the negative DC terminal of the first DC device is connected to the input reference (8c) of the last partial power DC-DC converter (1c). On the other hand, the positive DC terminal of the second DC device is connected to each of the first DC voltage outputs (9a, 9b, 9c) of the partial power DC-DC converters (1a, 1b, 1c) forming part of said plurality, and the negative DC terminal of the second DC device is connected to each of the output references (10a, 10b, 10c) of the partial power DC-DC converters (1a, 1b, 1c) forming part of said plurality. In turn, the input reference (8a) of the first partial power DC-DC converter (1a) is connected to the first voltage input (7b) of the second partial power DC-DC converter (1b); the input reference (8b) of the second partial power DC-DC converter (1b) to the first voltage input (7c) of the third partial power DC-DC converter (1c), and so on until all inputs of the plurality of partial power DC-DC converters (1a, 1b, 1c) are connected.

Figure 9:
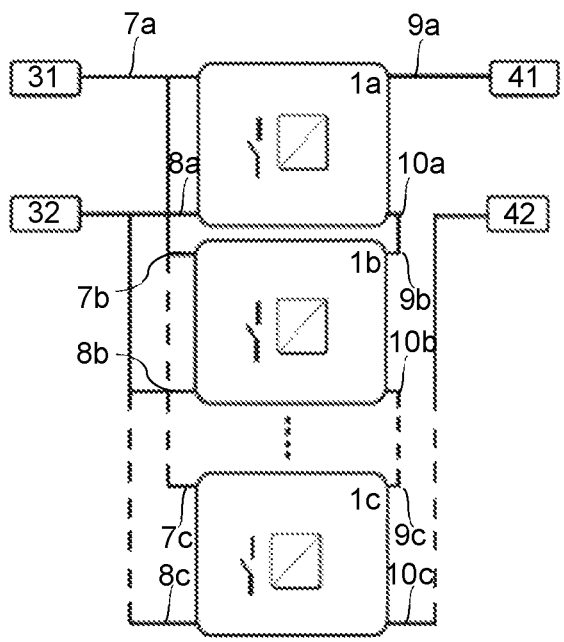
FIG. 9 illustrates the interconnection of a plurality of partial power DC-DC converters in accordance with the present invention in an input-parallel, output-series configuration.

In a third exemplary embodiment, as illustrated in FIG. 9 and without limiting the scope of the present invention, said plurality of partial power DC-DC converters (1a, 1b, 1c) may be connected in an Input-Parallel, Output-Series (IPOS) configuration. In this configuration, the positive DC terminal of the first DC device is connected to each of the first DC voltage inputs (7a, 7b, 7c) of the partial power DC-DC converters (1a, 1b, 1c) of the plurality. On its part, the negative DC terminal of the first DC device is connected to each of the input references (8a, 8b, 8c) of the partial power DC-DC converters (1a, 1b, 1c) of said plurality. On the other hand, the positive DC terminal of the second DC device is connected to the first DC voltage output (9a) of the first partial power DC-DC converter (1a) and the negative DC terminal of the second DC device is connected to the output reference (10c) of the last partial power DC-DC converter (1c). In turn, the output reference (10a) of the first partial power DC-DC converter (1a) is connected to the first voltage output (9b) of the second partial power DC-DC converter (1b), the output reference (8b) of the second partial power DC-DC converter (1b) to the first voltage output (9c) of the third partial power DC-DC converter (1c), and so on until all outputs of the plurality of partial power DC-DC converters (1a, 1b, 1c) are connected.

Figure 10:
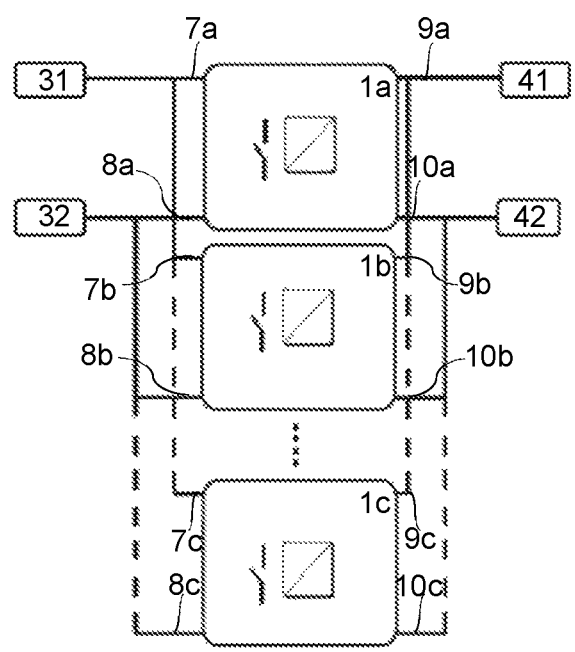
FIG. 10 illustrates the interconnection of a plurality of partial power DC-DC converters in accordance with the present invention in an input-parallel, output-parallel configuration.

In a fourth exemplary embodiment, as illustrated in FIG. 10 and without limiting the scope of the present invention, said plurality of partial power DC-DC converters (1a, 1b, 1c) may be connected in an Input-Parallel, Output-Parallel (IPOP) configuration. In this configuration, the positive DC terminal of the first DC device is connected to each of the first DC voltage inputs (7a, 7b, 7c) of the partial power DC-DC converters (1a, 1b, 1c) of the plurality. On its part, the negative DC terminal of the first DC device is connected to each of the input references (8a, 8b, 8c) of the partial power DC-DC converters (1a, 1b, 1c). Similarly, the positive DC terminal of the second DC device is connected to each of the first DC voltage outputs (9a, 9b, 9c) of the partial power DC-DC converters (1a, 1b, 1c) of said plurality, and the negative DC terminal of the second DC device is connected to each of the output references (10a, 10b, 10c) of the partial power DC-DC converters (1a, 1b, 1c) of said plurality.

According to the previously detailed description, it is possible to obtain a partial power DC-DC converter (1) whose topology is controllable by means of the switching state of said first switch (11), second switch (12), third switch (13), and fourth switch (14).

It should be understood that the various options described for the technical characteristics of the partial power DC-DC converter (1) which is the subject matter of the present invention may be combined with each other, or with others known to a person ordinarily skilled in the art, in any manner envisaged without limiting the scope of the present invention.

Examples of embodiments of the present invention will be described below. It should be understood that said examples of embodiments are intended to provide a better understanding of the invention and do not limit the scope of the same. Additionally, technical features described in different examples may be combined with each other, or with others previously described, in any manner envisioned by a person ordinarily skilled in the art without limiting the scope of the present invention.

Figure 4:
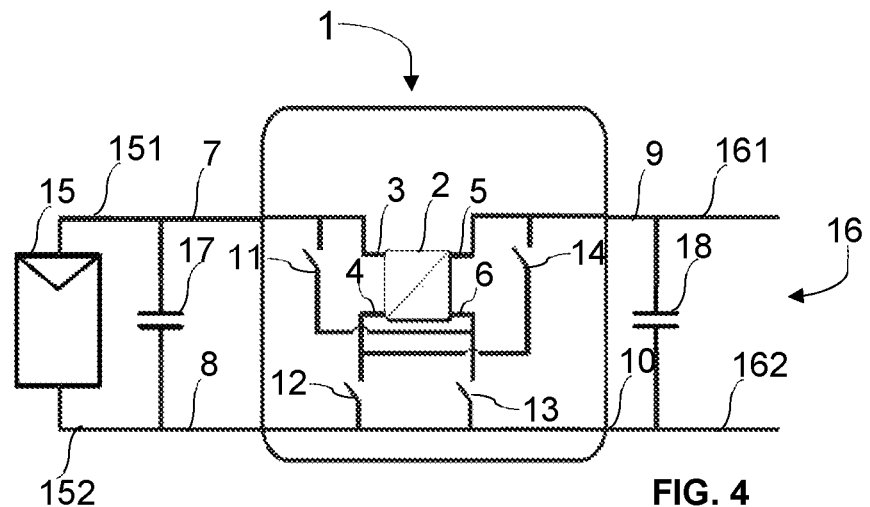
FIG. 4 illustrates an application of the partial power converter with controllable topology which is the subject matter of the present invention in a photovoltaic electric power generation system.

Example 1: Use of the Partial Power DC-DC Converter in Solar Photovoltaic Modules As schematically illustrated in FIG. 4, the partial power DC-DC converter that is the subject matter of the present invention can be used to connect a solar photovoltaic module (15) to a DC voltage line or bus (16). For this purpose, each of the positive (151) and negative (152) terminals of said solar photovoltaic module are connected to the first voltage input (7) and the input reference (8), respectively, of the partial power DC-DC converter (1). In turn, the positive (161) and negative (162) terminals of the DC voltage bus (16) are connected, respectively, to the first voltage output (9) and the output reference (10) of the partial power DC-DC converter (1). In addition, an input capacitor (17) connecting the first voltage input (7) to the input reference (8) and an output capacitor (18) connecting the first voltage output (9) to the output reference (10) are provided. In this exemplary embodiment, in addition, the DC-DC converter (2) is unidirectional in power.

Example 2: Use of the Partial Power DC-DC Converter in Battery Arrays

Figure 5:
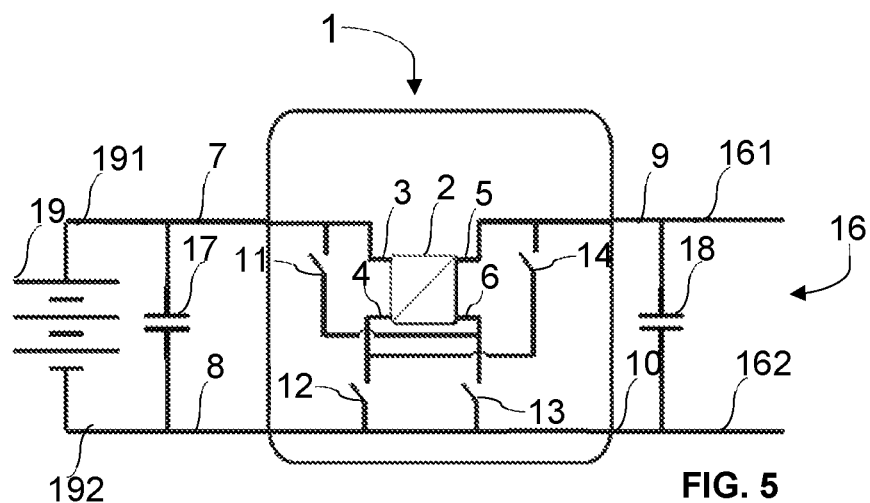
FIG. 5 illustrates an application of the partial power converter with controllable topology which is the subject matter of the present invention in an electrochemical electrical power generation system.

As schematically illustrated in FIG. 5, the partial power DC-DC converter that is the subject matter of the present invention can be used to connect a group of cells or battery array (19) to a DC voltage line or bus (16). For this purpose, each of the positive (191) and negative (192) terminals of said group of cells or battery array are connected to the first voltage input (7) and the input reference (8), respectively, of the partial power DC-DC converter (1). In turn, the positive (161) and negative (162) terminals of the DC voltage bus (16) are connected, respectively, to the first voltage output (9) and the output reference (10) of the partial power DC-DC converter (1). In addition, an input capacitor (17) connecting the first voltage input (7) to the input reference (8) and an output capacitor (18) connecting the first voltage output (9) to the output reference (10) are provided. In this exemplary embodiment, in addition, the DC-DC converter (2) is bidirectional in power, which allows both charging and discharging of the battery (19).

Figure 6:
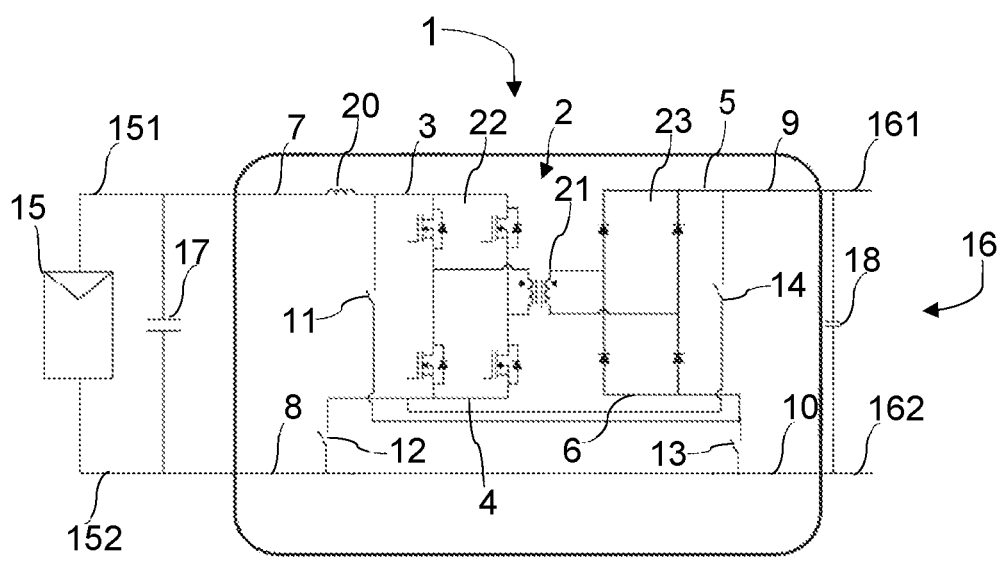
FIG. 6 illustrates an example embodiment of the partial power converter with controllable topology that is the subject matter of the present invention.

Example 3: Implementation of the Partial Power DC-DC Converter in Conjunction with a Solar Photovoltaic Module FIG. 6 illustrates a schematic diagram of an implementation of the partial power DC-DC converter in conjunction with a solar photovoltaic module. The connections are made as described in Example 1.

In this example, the DC-DC converter (2) is a galvanically isolated converter and includes a transformer (21) having a primary and a secondary. An H-bridge (22), consisting of four unidirectional switches, is connected to the primary of the transformer (21) and a bridge rectifier (23) is connected to the secondary of the transformer (21). In addition, an input inductor (20) is provided which connects the first voltage input (7) to the positive input (3) of the DC-DC converter (2).

The invention claimed is:

1. A partial power DC-DC converter with controllable topology, CHARACTERIZED in that it comprises:
   a galvanically isolated DC-DC converter having a positive input, a negative input, a positive output, and a negative output;
   a first DC voltage input electrically connected to said positive input of said DC-DC converter;
   an input reference;
   a first DC voltage output electrically connected to said positive output of said DC-DC converter; and
   an output reference electrically connected to said input reference;
   wherein said partial power DC-DC converter additionally comprises:
   a first switch arranged to selectively connect said positive input to said negative output of said DC-DC converter;
   a second switch arranged to selectively connect said negative input of said DC-DC converter to said input reference;
   a third switch arranged to selectively connect said negative output of said DC-DC converter to said output reference; and
   a fourth switch arranged to selectively connect said positive output to said negative input of said DC-DC converter.

2. The partial power converter of claim 1, CHARACTERIZED in that said first switch, said second switch, said third switch, and said fourth switch are unidirectional switches.

3. The partial power converter of claim 2, CHARACTERIZED in that each of said unidirectional switches consists of a field effect transistor in parallel with a rectifier diode.

4. The partial power converter of claim 1, CHARACTERIZED in that said first switch, said second switch, said third switch, and said fourth switch are bidirectional switches.

5. The partial power converter of claim 1, CHARACTERIZED in that said DC-DC converter is selected from the group consisting of forward converters, push-pull converters, H-bridge converters, flyback converters, half bridge converters, and Ćuk converters.

6. The partial power converter of claim 1, CHARACTERIZED in that said DC-DC converter comprises a transformer having a primary and a secondary, an H-bridge connected to the primary of said transformer, and a bridge rectifier connected to the secondary of said transformer.

7. The partial power converter of claim 6, CHARACTERIZED in that said transformer has a center-tapped secondary.

* * * * *